US009594951B2

(12) United States Patent
Bouaziz et al.

(10) Patent No.: US 9,594,951 B2
(45) Date of Patent: Mar. 14, 2017

(54) MOTOR VEHICLE HAVING A HANDWRITING RECOGNITION SYSTEM

(71) Applicant: AUDI AG, Ingolstadt (DE)

(72) Inventors: Tahar Bouaziz, Ingolstadt (DE); Michael Betz, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 136 days.

(21) Appl. No.: 14/436,908

(22) PCT Filed: Oct. 2, 2013

(86) PCT No.: PCT/EP2013/002962
§ 371 (c)(1),
(2) Date: Apr. 20, 2015

(87) PCT Pub. No.: WO2014/060068
PCT Pub. Date: Apr. 24, 2014

(65) Prior Publication Data
US 2015/0278592 A1    Oct. 1, 2015

(30) Foreign Application Priority Data
Oct. 19, 2012   (DE) .................. 10 2012 020 610

(51) Int. Cl.
*G06F 3/023*    (2006.01)
*G06K 9/00*    (2006.01)
(Continued)

(52) U.S. Cl.
CPC ...... *G06K 9/00422* (2013.01); *G01C 21/3611* (2013.01); *G06F 3/0237* (2013.01);
(Continued)

(58) Field of Classification Search
CPC ...... G06F 3/0488–3/04886; G06F 2203/0381; G06F 2203/04808; G06F 3/017; H04M 2250/70; G06T 7/0081
See application file for complete search history.

(56) References Cited

U.S. PATENT DOCUMENTS 6,282,316 B1 *   8/2001   Arai .................... G06F 3/04883
                                                                382/187
6,885,317 B1 *   4/2005   Gutowitz .............. G06F 3/0237
                                                                341/22
(Continued)

FOREIGN PATENT DOCUMENTS

DE    10324580    12/2004
DE    10349673    5/2005
(Continued)

OTHER PUBLICATIONS

WIPO English Language Translation of the International Preliminary Report on Patentability for PCT/EP2013/002962, mailed on Apr. 23, 2015, 6 pages.
(Continued)

*Primary Examiner* — Sanghyuk Park
(74) *Attorney, Agent, or Firm* — Staas & Halsey LLP

(57) ABSTRACT

A method operates an input apparatus for an electronic device in a motor vehicle. A sensing device senses a character trace from a user while the latter draws the character trace in order to input a character or a group of characters on an input surface of the sensing device. A first handwriting recognition device performs character recognition for the sensed character trace. A search device searches at least one database for at least one database entry in each case for a recognition result of the character recognition. To allow comprehensible device operation by handwriting recognition in a motor vehicle, the first handwriting recognition device ascertains a plurality of different recognition results (Continued)

for the character trace and the search device searches for at least one database entry in each case for each of the different recognition results.

17 Claims, 1 Drawing Sheet

(51) Int. Cl.
    *G06K 9/68*     (2006.01)
    *G06F 3/0488*     (2013.01)
    *H04M 1/2745*     (2006.01)
    *G01C 21/36*     (2006.01)
    *G06K 9/72*     (2006.01)

(52) U.S. Cl.
    CPC ....... *G06F 3/04883* (2013.01); *G06K 9/6807* (2013.01); *G06K 9/723* (2013.01); *G06K 9/726* (2013.01); *H04M 1/274533* (2013.01); *G06K 2209/01* (2013.01)

(56) References Cited

U.S. PATENT DOCUMENTS

| | | | |
|---|---|---|---|
| 8,094,941 B1* | 1/2012 | Rowley | G06F 3/04883 382/186 |
| 2002/0114516 A1 | 8/2002 | Aharonson | |
| 2004/0078756 A1 | 4/2004 | Napper et al. | |
| 2006/0215937 A1* | 9/2006 | Snapp | G06K 9/723 382/311 |
| 2007/0120830 A1 | 5/2007 | Kaemmerer | |
| 2008/0019591 A1 | 1/2008 | Iwayama et al. | |
| 2009/0116744 A1* | 5/2009 | Woo | G06K 9/6255 382/187 |
| 2010/0161594 A1 | 6/2010 | Prasad et al. | |
| 2010/0169841 A1 | 7/2010 | Singh | |

FOREIGN PATENT DOCUMENTS

| | | |
|---|---|---|
| DE | 102005031656 | 1/2007 |
| DE | 102011017261 | 10/2012 |
| DE | 102012020610.0 | 10/2012 |
| EP | 1475693 | 11/2004 |
| JP | 2012-53844 | 3/2012 |
| WO | PCT/EP2013/002962 | 10/2013 |

OTHER PUBLICATIONS

German Office Action for German Priority Patent Application No. 10 2012 020 610.0, issued Jul. 22, 2013, 5 pages.

English Language of the International Search Report for PCT/EP2013/002962, mailed Apr. 8, 2014, 3 pages.

* cited by examiner

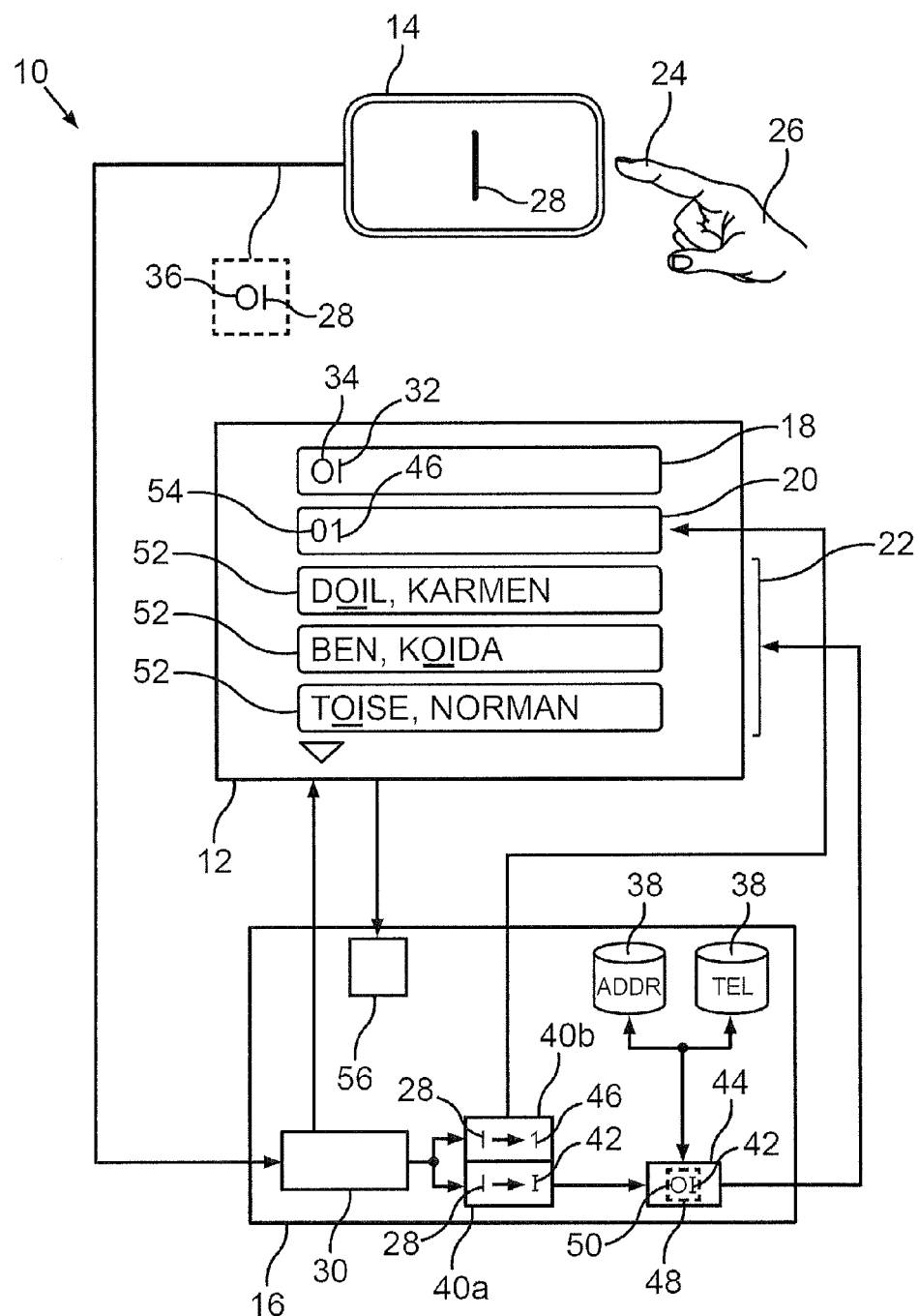

MOTOR VEHICLE HAVING A HANDWRITING RECOGNITION SYSTEM

CROSS REFERENCE TO RELATED APPLICATIONS

This application is based on and hereby claims priority to International Application No. PCT/EP2013/002962 filed on Oct. 2, 2013 and German Application No. 10 2012 020 610.0 filed on Oct. 19, 2012, the contents of which are hereby incorporated by reference.

BACKGROUND

The invention relates to a motor vehicle having an input apparatus for operating an electronic device in the motor vehicle. The invention also includes an input apparatus having a character or handwriting recognition section and also a method for operating the input apparatus.

In a vehicle having a navigation system or an infotainment system, an input apparatus can be used to search a navigation database for a place name by drawing letters on an input surface by hand.

Such an input device is known from EP 1 475 693 A2, for example. According to this, a user inputs individual letters by respectively drawing a character trace of the letter on an input surface, for example a touchscreen. On the basis of the character trace, a handwriting recognition device then performs character recognition and thus recognizes the character that the user means, that is to say in this case the letter. The character trace displayed on a screen is then replaced with the recognized letter. In this way, the user can input the beginning of a place name in handwriting letter by letter, which place name is then automatically completed where possible on the basis of a database search if the place name can be determined unambiguously from the previously input letters.

One problem with the use of handwriting recognition systems is that a character trace cannot always be unambiguously associated with a particular character. For example, if the user draws a vertical line "l", this line may mean the uppercase letter I, the lowercase letter l or else the number 1. A handwriting recognition system then outputs as the recognition result that character which matches the character trace to the greatest extent. If the user has written in a scruffy manner and the recognition result is therefore incorrect, the input by the user in the case described above is sometimes automatically augmented to produce a place name that the user did not mean at all. It is then unclear to the user why the input apparatus suddenly displays this incorrect place name.

SUMMARY

One possible object is to allow clear device operation by handwriting recognition in a motor vehicle.

The inventors propose a method with which ambiguities in the recognition of the character trace are taken into account. The method accordingly provides for a handwriting recognition device, that is to say a character recognition device for recognizing characters that are input in handwriting, to ascertain for an ambiguous character trace not only that recognition result (that is to say a letter or a number, for example) that has the greatest match with the character trace but also a plurality of different recognition results. Thus, in the example cited above, both the uppercase letter I and the lowercase letter l, the number 1 and possibly also the uppercase letter J are each ascertained as a recognition result for a vertical line "l". The display device is then designed to display a hits list formed on the basis of the different recognition results.

In this case, the hits list is not formed directly from the recognition results themselves. Instead, a database search in at least one database by a search device is used to search for at least one database entry for each of the different recognition results. In other words, that is to say after a new character trace has been recognized, a place name search in a navigation database is performed and refined after the input of further characters each time, for example. The hits list is then formed from the database entries found for the different recognition results. For the individual hits, those word components which the system has matched on the basis of the handwriting input, that is to say for which the system has recognized a match, are preferably highlighted in a particular manner in the hits list (e.g. in color or by underlining).

Drawing on the input surface does not mean that the user paints a line using a paint. Rather, it is sufficient if the user strokes a finger, for example, over a touch-sensitive input surface of a touchpad, a touchscreen or a comparable sensor arrangement that senses the path or trajectory covered by the fingertip, for example, capacitively or optically, for example.

An individual character trace does not have to represent an entire word here. The character recognition can be performed as early as after the input of a character trace for an individual character, that is to say a letter, a number or else a special character (e.g., ; - ! ?), or alternatively after the input of a character trace for a group of characters comprising a plurality of characters in each case. Said group of characters does not need to be the complete word in this case. It is thus possible for the user to draw three characters in succession as a character trace, for example, before the character recognition for said character trace begins. The character trace does not have to include just a single line. The user can thus input a word, for example, letter by letter, with ambiguities in the individual character traces meaning that all those found database entries that can be read for the recognized letter sequence are displayed in the hits list each time. By way of example, it would thus be possible for the input of the two character traces for "O" and "I" to result in a hits list having place names and telephone numbers, for example, each containing one of the following character strings: "OI", "01", "ol" and "OJ".

In other words, the sensing device preferably therefore senses a plurality of character traces in succession and in this case first of all performs character recognition for the current character trace each time after each of the character traces has been sensed and then defines the database search more precisely on the basis of the recognition results for all previously sensed character traces, i.e. the number of database entries found is reduced where possible with every further character that is input. Since the database search is defined even more precisely after each character trace has been input, the user advantageously recognizes which character the handwriting recognition system recognizes as ambiguous.

According to another embodiment of the method, the database search is begun each time as soon as a predetermined criterion is satisfied following the sensing of the character trace. By way of example, provision may thus be made for the database search to be begun as soon as the user has lifted a drawing instrument, that is to say a finger or an input stylus, for example, from the input surface. Another suitable criterion states that the character trace must have remained unaltered for a predetermined period of time. The use of a criterion for the beginning of the database search has the advantage that suitable criteria can stipulate when the display produced by the display device is altered. If this happens too early, the user is unsettled when drawing the character trace.

As already stated, the user can use the input field to input both numbers and letters. After searching databases of the system (that is to say, for example, an address book, a favorites list with a selection of database entries which are used particularly frequently, a database for telephone numbers), the input apparatus proposed by the inventors then discerns whether the user is currently looking for a known contact or wishes to input a new telephone number. In this context, an advantageous development provides for each sensed character trace to be additionally supplied to a further handwriting recognition device which performs solely character recognition for a new telephone number input, that is to say handwriting recognition specialized in recognizing telephone numbers. The recognition result from this second handwriting recognition device is displayed by the display device as a new telephone number entry. The hits list therefore includes two areas: one area continuously shows a new telephone number which has been input and can be read for the previously input character traces. A second area shows the list containing database entries found in an address database and a telephone number database, for example. The user can then select either the new number from one area or a found contact from the other area of the hits list. This embodiment has the advantage that the user can immediately discern whether the telephone number input by him is already stored in one of the databases.

In this case, the use of two handwriting recognition devices has the advantage that they can be configured differently. However, when implementing two different handwriting recognition devices, it is also possible to resort to a single handwriting recognition system here which is alternately operated with different configurations in order to perform character recognition for a particular character trace.

The different configuration means that, in the case of the second handwriting recognition device (that for recognizing new telephone numbers), digit recognition is preferred over letter recognition when the character trace is ambiguous. For example, if the user inputs a character trace "O", this is preferably recognized as zero "0" and not as the uppercase letter "O" according to this configuration, and a corresponding recognition result is output. If, for example, the input field for the new telephone number is therefore still empty, digits are always given a higher priority by the second handwriting recognition device when, for example, "I" is not unambiguously input and, in this case, a one "1" is inserted into the row for the new telephone number and not the uppercase letter "I". In contrast, the first handwriting recognition device can output both "1" and, for example, "I" and/or "J" or else the lowercase letter "l".

However, it may also be the case that the user wishes to input a so-called vanity number, that is to say a telephone number which is defined using a letter sequence. For example, such a vanity number may be: "0180AUDI-HILFE". If the user unambiguously writes the letter "A" for the purpose of inputting such a vanity number, for example, the second handwriting recognition system should also transfer the letter "A" to the row for the new telephone number. This is advantageously achieved by virtue of the second handwriting recognition device indeed giving preference to digit recognition but also performing letter recognition.

After the first letter has been input, the second handwriting recognition device should then assume, when further character traces are input, that the user now wishes to input letters since vanity numbers generally comprise a sequence of a plurality of letters. If the user inputs a letter in a very scruffy manner in this case, that is to say if the associated character trace from the user is ambiguous, the second handwriting recognition section should robustly recognize a further letter here and should not output a digit, with the result that the user can also enter the rest of the vanity number (that is to say "UDIHILFE" in the example) in the telephone row without any difficulties. For this purpose, one preferred embodiment of the method provides for the second handwriting recognition device to be reconfigured when it unambiguously recognizes a letter (that is to say the "A" in the example) and for this to activate a second configuration which means that letter recognition is now preferred over digit recognition when the character trace to be recognized is ambiguous.

The described preference for digit recognition over letter recognition and vice versa can be achieved, for example, in a recognition system by an offset which is added to a value for a degree of similarity for the respective character type (digit or letter) when the evaluation of the character trace is involved.

The "unambiguous" recognition must also be defined for this embodiment. Recognition of a letter can be considered to be unambiguous when, for example, a value for the degree of similarity between a letter in question and the character trace, on the one hand, and a value for the degree of similarity between a digit in question and the character trace, on the other hand, are greater despite preference being given to the digit. "Unambiguous" can also be defined such that a difference between the two values is nevertheless smaller than a predetermined value as a result of the offset despite preference being given to the digit. In other words, letter recognition can therefore be considered to be unambiguous when, despite preferred digit recognition, the letter is still recognized as the most likely character or when a particular digit and the letter are considered to be virtually equivalent recognition results.

When implementing telephone number recognition with vanity numbers, it must be borne in mind that a vanity number does not necessarily end with a closed letter sequence. It may also be the case that the vanity number again includes a number after several letters. One embodiment of the method takes this into account by virtue of the second handwriting recognition device being reconfigured when a number is unambiguously recognized again. The recognition unambiguity can again be defined in connection with the unambiguous recognition of a letter.

In the case of the second handwriting recognition device as well, it is possible to provide for a plurality of different recognition results to be determined and for the display device to then display not only a single new telephone number but rather a plurality of new telephone book entries on the basis of the different recognition results. If appropriate, provision may be made here for the user to select the correct telephone number from time to time during input or else after the entire telephone number has been input and for the other telephone numbers to be deleted. The display of the different recognition results has the advantage that it becomes clear to the user what writing style the recognition system has problems with.

Another embodiment of the method has the advantage that the user can manually change a recognized character and can therefore influence the recognition behavior of one of the two handwriting recognition devices. For example, if the user has input a vertical line "|" and if one of the handwriting recognition devices has recognized a one "1", for example, even though the user would like to input an uppercase letter "I", he can correct the recognition by having the character recognition repeated again by deleting the recognized letter and inputting the vertical line "|" again. When a character trace is recognized again using the handwriting recognition device, a character different than the deleted character is preferred as the recognition result. As a result of the deletion, the handwriting recognition system thus recognizes that "1" was not meant by the user. Therefore, the second time and when a similar character trace is input, the next possible character is output as the result, that is to say the uppercase letter "I" here, as the recognition result. For the deletion itself, the sensing device, that is to say the touchpad for instance, or else another operating element, for example a delete key, senses a delete command for deleting the character input last, which delete command is given by the user. The display device then deletes the individual character which was incorrectly recognized so that the character can be input again.

The text below describes yet further embodiments which relate to the search in the database.

When searching the database, unlike in the related art, it is not absolutely necessary to assume that the input characters form the beginning of a word or of a telephone number, or generally of a database entry. Although the match criterion that is taken as a basis for searching the database may also stipulate such a prefix search, additionally or alternatively an infix search (the previously input character string may also be within a word) and/or a suffix search (the character string describes the end of the word) may also be stipulated. In connection with the method, it has been found that it is no problem to increase the search area in a database by a multiple by an infix search and a suffix search without confusing a user with a large number of the database entries found. Since the original handwriting continues to be displayed on the display device, it remains possible for the user to tell—even when there are ambiguous character traces—how the information displayed in the hits list has been obtained.

In order to develop a handwriting recognition device, as known per se from the related art, such that it can use the method to ascertain a plurality of different recognition results for an individual character trace, an embodiment of the method provides for the handwriting recognition device to ascertain for each of a plurality of possible recognition results a recognition value that is a measure of a match between the character trace and a respective, possible recognition result. Such a recognition value is an inherently known variable in connection with pattern recognition. By way of example, in the case of handwriting recognition on the basis of hidden Markov models (HMM), it is possible to ascertain a likelihood value or a log likelihood value. According to the related art, the handwriting recognition system then outputs that possible recognition result for which the measure indicates the greatest match as the end result.

The recognition values for a plurality of possible recognition results are made accessible in such a recognition system according to one embodiment. It is thus possible to search specifically for those possible recognition results whose recognition value indicates that the match is at least greater than a predetermined minimum. In the case of a character trace for a letter, for example, it is thus not only possible for the most similar letter, but rather the two or three most similar letters that have the greatest match with the prescribed character trace can be ascertained as the recognition result. In the examples above, not only the uppercase letter I but also the lowercase letter l and the number 1, for example, would thus be output for a vertical line | if the three most similar recognition results were to be chosen.

As already stated at the outset, the inventors also propose an input apparatus for an electronic device in a motor vehicle. Said input apparatus is set up to carry out an embodiment of the method.

The inventors also propose a motor vehicle, which has likewise already been cited, is distinguished by an embodiment of the proposed input apparatus that is provided in the motor vehicle. In the motor vehicle, the input apparatus is then preferably designed to operate a navigation device and/or an infotainment system and/or a mobile radio system of the motor vehicle. Hence, a user of the motor vehicle can advantageously use the input apparatus to select a place name in a navigation database, for example, a music title in an infotainment system, for example, and a telephone number or the name from an address book in a mobile radio system by handwritten input of at least a part of the search term.

BRIEF DESCRIPTION OF THE DRAWINGS

These and other objects and advantages of the present invention will become more apparent and more readily appreciated from the following description of the preferred embodiments, taken in conjunction with the accompanying drawings of which:

To this end, the single FIGURE (FIG.) shows an input apparatus 10 that is a preferred embodiment of the input apparatus. By way of example, the input apparatus 10 may be installed in a motor vehicle, particularly an automobile. The input apparatus 10 may comprise a display device 12, for example a screen with an associated electronic controller, an input surface 14, for example a touchpad or a character area based on capacitive or optical sensing, and a control device 16. Instead of the single control device 16 shown in the FIGURE, a group of a plurality of control devices may also be provided. The control device 16 may be part of an infotainment system of the motor vehicle, for example.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The display device can be used to display an input field 18 having a handwriting display, a telephone row 20 (or else a plurality of telephone rows) for inputting a new telephone number and a hits list 22 containing addresses or other contact data for a user.

In the example on which the FIGURE is based, the user wishes to input a telephone number or a contact name. For this purpose, the user strokes a finger 24 of one hand 26 over the input surface 14 and thus draws a character trace 28 on the input surface 14. The sensors in the input surface 14 sense the character trace 28 and transmit corresponding signals to an evaluation device 30 of the control device 16, which evaluates the signals. The evaluation device 30 and the input surface 14 together form a sensing device for the character trace 28.

During input, a display is produced on the display device 12, which can be displayed an image 32 of the character trace 28 together with images 34 of previously sensed character traces 36 in the order in which they were input.

For the user's input, a check is automatically carried out in order to determine whether the input is an already known contact or an already known telephone number or whether the user is inputting a new telephone book entry. For this purpose, databases 38 in the motor vehicle, for example an address database and a telephone number database, are searched for database entries containing a character sequence which is predefined by the user with the input character traces 28, 36.

The data which are produced by the evaluation device 30 from the sensor signals from the touchpad 14 and relate to the character traces 28, 36 are also transmitted to a handwriting recognition section 40 for this purpose. The handwriting recognition section 40 has two components 40*a*, 40*b*. The component 40*a* comprises a character recognition algorithm which is designed for character recognition of letters, digits and further characters such that it equally recognizes a character irrespective of its type (digit or letter). In contrast, the component 40*b* comprises a character recognition algorithm which preferably recognizes digits and, only in the case of a character trace which very clearly represents a particular letter, also actually outputs this letter as the recognition result.

The handwriting recognition section 40 performs handwriting recognition for the current character trace 28 in the situation shown in the FIGURE. In the present example, the component 40*a* recognizes the letter "I" in the character trace 28. The letter that has been recognized forms the, in this case unambiguous, recognition result 42 of the handwriting recognition by the component 40*a* for the character trace 28. The recognition result 42 is forwarded to a search device 44 for a database search.

On account of its configuration which prefers digit recognition, the component 40*b* recognizes the number "1" as a recognition result 46 in the character trace 28.

The search device 44 is coupled to the databases 38 and is designed to find in the databases 38 at least one database entry that has a part that matches a search character string 48 that is formed from the previously recognized characters. In the example shown, the search character string 48 is formed from the current recognition result 42 and also the recognition result 50 recognized for a preceding character trace. In the situation shown in the FIGURE, the letter sequence "OI" has already been recognized. In the present example, the database search is configured to search the databases 38 both with a prefix and with an infix and suffix match as the search criterion. The database search 44 finds a large number of database entries that match the search character string 48, that is to say in this case "OI", according to the search criterion set.

The database entries 52 found are transmitted from the search device 44 to the display device 12. The parts which are recognized in the database entries 52 found and match the search character string 48 may be marked. The display device 12 presents the database entries 52 found as the hits list 22. If the sought database entry is among the database entries 52 found and displayed in the hits list 22, the user can select the sought name directly, for example by tapping, so that a control module 56 can configure the mobile telephone, for example, as appropriate for setting up a connection on the basis of the selected database entry. Otherwise, the user can input a further character trace so as thereby to define the database search more precisely.

By way of example, the components shown for the control device 16, that is to say the evaluation device 30, the handwriting recognition section 40, the search device 44 and the control module 56, may be program modules that may be part of an operating program of the control device 16. The handwriting recognition section 40 may be a recognition algorithm that is known per se from the related art. The database search by the search device 44 may likewise be realized by a search algorithm that is known per se.

The recognition result 46 determined by the component 40 *b* for the character trace 28 and also a recognition result 54 determined for a preceding character trace 36 are likewise displayed by the display device 12, to be precise in the telephone row 20 for a new telephone number. On the basis of the empty input field in the row 20, if a horizontal line "|" is not unambiguously input for example, the component 40 *b* the component 40 *b* always gives higher priority to digits than letters, with the result that, when the character traces 36, 28: "O, I" are input in the example shown, the digits "0, 1" (recognition results 54, 46) were inserted in the telephone row 20.

However, the component 40 *b* can also be reconfigured. If the user unambiguously writes the letter "A", for example, the component 40 *b* also transfers the letter "A" to the telephone row 20. After such a letter has been unambiguously input, the component 40 *b* then assumes that the user now wishes to input letters for a vanity number and, in the case of subsequent character traces which are not unambiguous, now preferably outputs letters as recognition results which are then likewise displayed in the telephone row 20. If an unambiguous character trace of a digit is then made again, the component 40 *b* again assumes that the user now wishes to continue to input digits and preferably outputs digits as the recognition result in the case of a character trace which is not unambiguous. New vanity numbers can therefore also be easily input using the system. A recognized character can likewise be manually deleted in the manner already described in the input apparatus 10 shown in the FIGURE.

The example describes an input apparatus having an input surface 14 for a touch input with handwriting recognition. The user can input both numbers and letters in the input field 14. After searching databases 38 for addresses and stored telephone numbers, the system discerns whether the user is currently searching for a contact or would like to input a new telephone number. If, for example, "O" is input on the input surface 14, the user then also need not decide whether he intends a number zero "0" or the uppercase letter "O". Disambiguation is likewise dispensed with. The system automatically provides, if recognized, search results for both characters in the hits list 22 and additionally writes a new telephone number in the telephone row 20, which telephone number is then preferably formed by digit recognition instead of letter recognition until an unambiguous letter input is recognized.

Overall, the search in the address and telephone number databases and the input of a new telephone number are therefore carried out more quickly, more easily and more intuitively.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for operating an input apparatus for an electronic device in a motor vehicle, comprising:
sensing with a sensing device, a character trace from a user while the user draws the character trace in order to input at least one character on an input surface of the sensing device, the sensing device outputting a sensed character trace;
performing at a first handwriting recognition device, character recognition for the sensed character trace to thereby produce first recognition results;
performing at a second handwriting recognition device, character recognition to recognize alphanumeric characters in the sensed character trace and produce second recognition results, each second recognition result being used for telephone number recognition, the second recognition results being different from the first recognition results;
using a search device to search at least one database for at least one database entry for each of the first and second recognition results; and
displaying with a display device, database entries that were retrieved by the search device, the display device displaying a new telephone number entry which is expanded with each new recognition result from the second handwriting recognition device, wherein
the second handwriting recognition device is first configured in a first configuration to preferentially recognize a digit over a letter when the sensed character trace is ambiguous,
the second handwriting recognition device is reconfigured when the second handwriting recognition device unambiguously recognizes a letter, the second handwriting recognition device being reconfigured to activate a second configuration which preferentially recognizes a letter over a digit in the sensed character trace when the sensed character trace is ambiguous.

2. The method as claimed in claim 1, wherein
the sensing device senses a plurality of character traces in succession,
following sensing of each of the character traces, character recognition is performed in the first handwriting recognition device for a current character trace, and
the database is searched based on the first recognition results associated with the plurality of character traces, including the current character trace and at least one preceding character trace.

3. The method as claimed in claim 1, wherein the second handwriting recognition device has a different configuration from the first handwriting recognition device.

4. The method as claimed in claim 1, wherein the second handwriting recognition device has a different configuration and different recognition preferences from the first handwriting recognition device.

5. The method as claimed in claim 1, wherein
after the second configuration is activated for the second handwriting recognition device, the second handwriting recognition device is reconfigured to a third configuration when a number is unambiguously recognized, and in the third configuration, the second handwriting recognition device preferentially recognizes a digit over a letter when the sensed character trace is ambiguous.

6. The method as claimed in claim 1, wherein
the second handwriting recognition device produces a plurality of different second recognition results for the sensed character trace, and
the display device displays a plurality of new telephone book entries based on the plurality of different second recognition results.

7. The method as claimed in claim 1, wherein
a delete command is received from the user, to delete an individual character ascertained for a most recent character trace,
the display device deletes as a deleted character, the individual character ascertained for the most recent character trace, and
when character recognition is performed on a next character trace, a character different from the deleted character is preferred for the first and second recognition results ascertained for the next character trace.

8. The method as claimed in claim 1, wherein
first and second character traces are received on the input surface,
for the first character trace, the plurality of different first recognition results are produced, and
for the second character trace, only one first recognition result is produced.

9. The method as claimed in claim 1, wherein
the search device searches an address database and a telephone number database,
the search device searches the address database for each of the different first recognition results, and
the search device searches the telephone number database for the second recognition results.

10. The method as claimed in claim 1, wherein
the display device has first and second areas,
the first area continuously shows a new phone number which has been input by way of character traces, and
a second area shows a list containing database entries found in an address database.

11. The method as claimed in claim 1, wherein a character is unambiguously recognized when a degree of similarity between a potential recognition result and the character trace is greater than a predetermined value.

12. The method as claimed in claim 1, wherein handwriting recognition is used to control at least one of a navigation device, an infotainment system and a mobile radio system of a motor vehicle.

13. The method as claimed in claim 1, wherein the first and second handwriting recognition devices are embodied as program modules of an operating program.

14. The method as claimed in claim 1, wherein
the display device has a telephone number row to display the new telephone number entry, and
the display device has a display area to display, concurrently with the telephone number row, the entries that were retrieved by the search device.

15. An input apparatus for an electronic device in a motor vehicle, comprising:
a sensing device to sense a character trace from a user while the user draws the character trace in order to input at least one character on an input surface of the sensing device, the sensing device outputting a sensed character trace;

a first handwriting recognition device to perform character recognition for the sensed character trace to thereby produce first recognition results;

a second handwriting recognition device to perform character recognition to recognize alphanumeric characters in the sensed character trace and produce second recognition results, each second recognition result being used for telephone number recognition, the second recognition results being different from the first recognition results;

a search device to search at least one database for at least one database entry for each of the first and second recognition results; and a display device to display database entries that were retrieved by the search device, the display device displaying a new telephone number entry which is expanded with each new recognition result from the second handwriting recognition device, wherein the second handwriting recognition device is first configured in a first configuration to preferentially recognize a digit over a letter when the sensed character trace is ambiguous, the second handwriting recognition device is reconfigured when the second handwriting recognition device unambiguously recognizes a letter, the second handwriting recognition device being reconfigured to activate a second configuration which preferentially recognizes a letter over a digit in the sensed character trace when the sensed character trace is ambiguous.

16. A motor vehicle having an input apparatus as claimed in claim 15.

17. The motor vehicle as claimed in claim 16, wherein the input apparatus operates at least one of a navigation device, an infotainment system and a mobile radio system in the motor vehicle.

* * * * *